Nov. 19, 1968  J. O. MELTON ET AL  3,411,803
VEHICLE IDLER ARM
Filed June 20, 1966  2 Sheets-Sheet 1
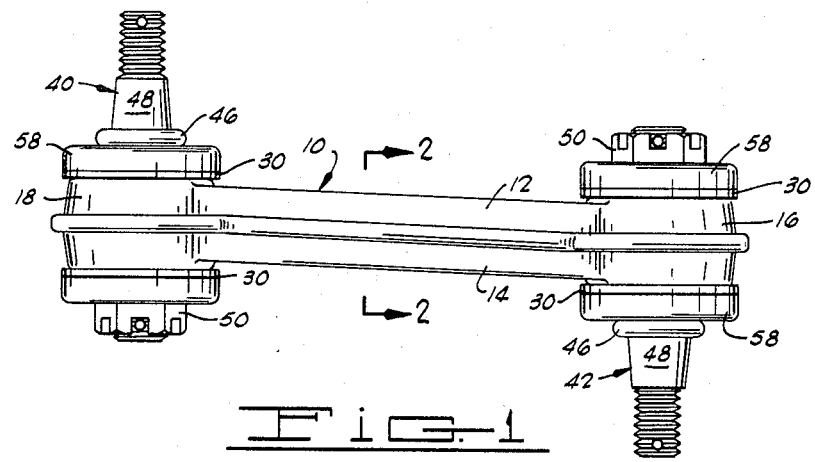
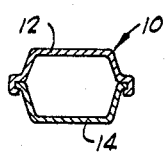
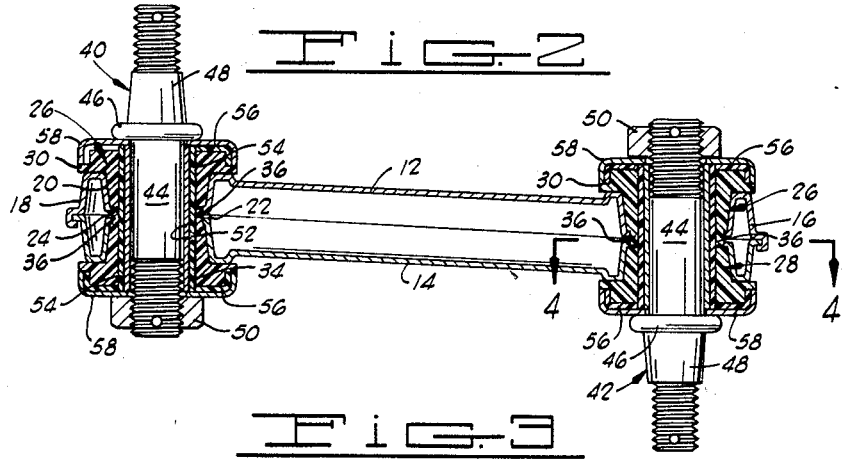
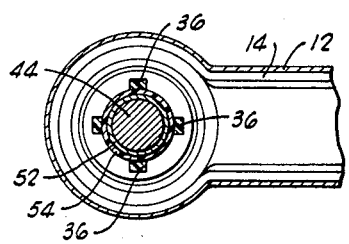
INVENTORS
JAMES O. MELTON,
THOMAS B. WILKINSON &
JAMES H. JACKSON
ATTORNEYS Nov. 19, 1968  J. O. MELTON ET AL  3,411,803
VEHICLE IDLER ARM
Filed June 20, 1966  2 Sheets-Sheet 2
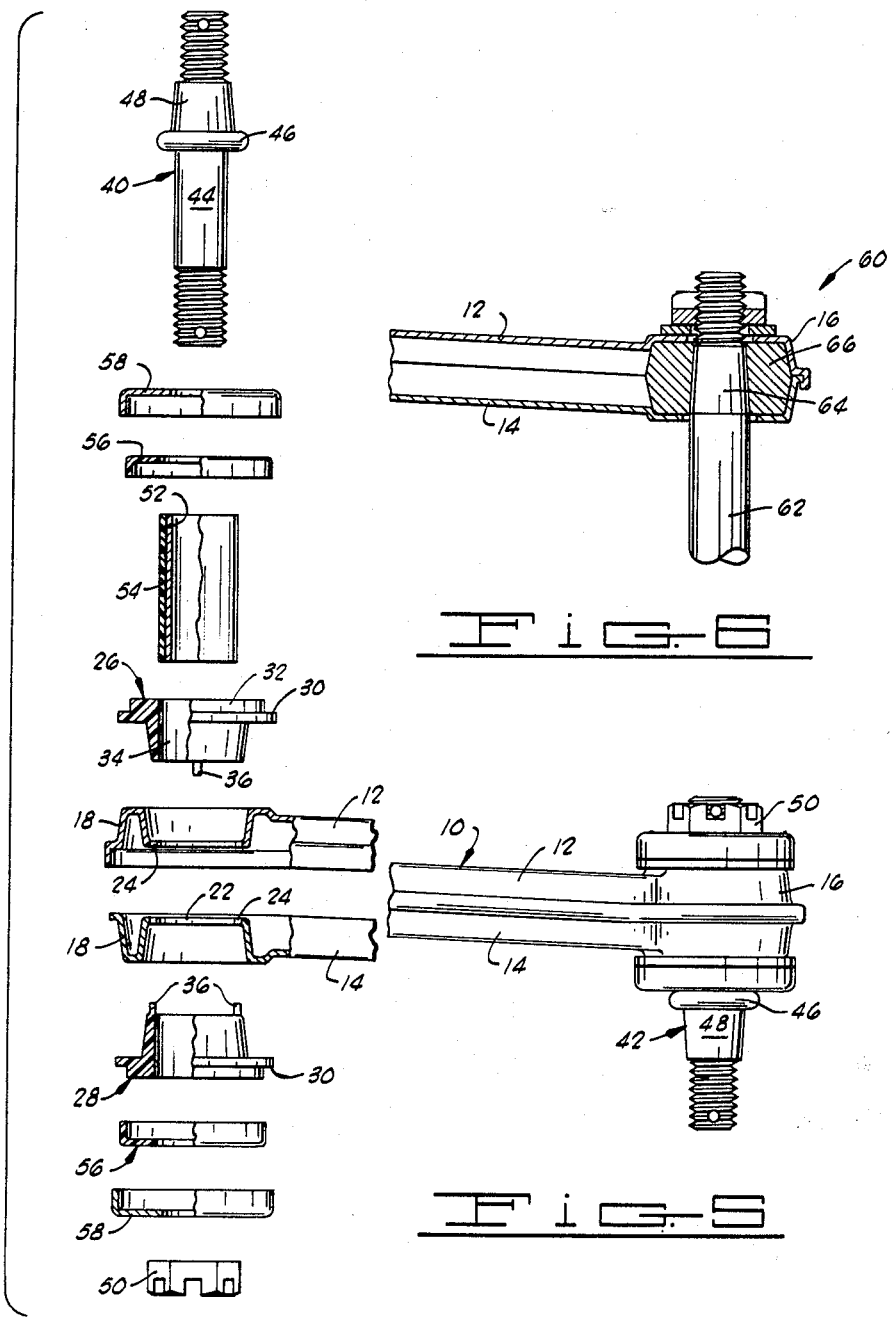
INVENTORS
JAMES O. MELTON,
THOMAS B. WILKINSON &
JAMES H. JACKSON
ATTORNEYS

3,411,803
VEHICLE IDLER ARM
James O. Melton, Norman, and Thomas B. Wilkinson and James H. Jackson, Oklahoma City, Okla., assignors to Jamco, Inc., Oklahoma City, Okla., a corporation of Oklahoma
Filed June 20, 1966, Ser. No. 558,827
10 Claims. (Cl. 280—95)

ABSTRACT OF THE DISCLOSURE

An idler arm constructed of two stamped halves joined along a central parting plane containing the longitudinal axis of the idler arm, the idler arm having apertured, spindle-receiving hub portions at each end thereof. The idler arm further includes a synthetic resin cylindrical sleeve disposed inside a pair of aligned annular, synthetic resin bushing members which are pressed into at least one of the apertured hub portions from the opposite sides thereof and keyed to the stamped halves of the idler arm. A spindle extends through the sleeve and is secured to the idler arm.

---

This invention relates to an improved idler arm for use in interconnecting two relatively moving parts in the front end steering assembly of automobiles. More specifically, but not by way of limitation, the invention relates to a novel, relatively light weight, high mechanical strength idler arm construction which is utilized for interconnecting the drag link of an automobile steering mechanism to a fixed idler arm bracket so that the drag link can move freely relatively to such bracket during the operation of the automobile.

A great many different constructions of idler arms have recently been proposed, and one of the more recent innovations is the employment of high density synthetic resin bearing materials in the idler arm for the purpose of reducing costs and weight while continuing to provide good bearing surfaces having a relatively low coefficient of friction. Frequently, the bearings used in idler arms of this type include multi-part synthetic resin or plastic bearing sleeves and bushings which are loaded in compression during the operation of the idler arm.

The present invention provides an improved idler arm assembly in which an idler arm of the general type previously used and characterized in having a pair of apertured hubs at each end thereof is constructed of two interconnected stamped parts. By the two-part construction of the idler arm in which the parts are interlocked and provide the arm with a hollow interior, the arm may be more economically and expeditiously constructed, and yet is characterized in having a high mechanical strength which is more resistant to destructive torque forces than the solid metal type idler arms heretofore provided. Moreover, the improved idler arm of the invention is further characterized in having a pair of efficient bearing structures located in the apertured hub at each end of the arm, which bearing structures offer minimum resistance to relative movement between the two parts interconnected by the idler arm and are resistant to corrosion and fatigue as a result of the inherent characteristics or properties of the synthetic resins from which such bearing structures are manufactured.

Broadly described, the idler arm assembly of the invention comprises a two-part hollow idler arm having two mating parts joined at a central parting plane containing the longitudinal axis of the idler arm, with the idler arm further having apertured, spindle-receiving hub portions at each end thereof. Positioned in the aperture through at least one of the hub portions is a synthetic resin bushing means which itself is centrally apertured to receive a spindle which is extended through the bushing means. A sleeve means snugly but movably surrounds the spindle inside of the bushing means and is in bearing contact with the bushing means to permit relative rotation between the sleeve means and the bushing means. In a preferred embodiment of the invention, the described synthetic resin bushing means and the sleeve means are provided in the hub portions at both ends of the two-part idler arm, and the sleeve means which is provided includes a metallic sleeve or liner which is in juxtaposition to spindles extending through each of the hub portions of the idler arms and a high density synthetic resin sleeve or liner which fits tightly around the metallic sleeve and is in bearing contact with the adjacent portions of the synthetic resin bushing means which defines the aperture receiving the spindle and its associated sleeve elements. In this preferred construction, relative movement occurs between the resin liner and the synthetic resin bushing means to provide an improved bearing action with minimum resistance to turning.

In a different embodiment of the invention, a generally cylindrical, metallic bushing is secured in the aperture through the hub portion at one end of the idler arm, such metallic bushing having a tapered or frusto-conical aperture therethrough which receives a tapered spindle or stud pressed into the tapered aperture. This embodiment of the invention is employed in those automobile steering linkages which include a drag link carrying a tapered spindle of the type described. The apertured hub portion at the other end of the idler arm will usually carry synthetic resin bearing elements of the type hereinbefore described.

From the foregoing description of the invention, it will have become apparent that a major object of the present invention is to provide an improved idler arm assembly which is of light weight, high mechanical strength and characterized by the inclusion of bearing structures for interconnecting two relatively moving portions of an automobile steering assembly so that these elements may move freely with respect to each other.

A further object of the present invention is to provide an improved idler arm assembly in which bearing structures are used for interconnecting two relatively moving parts, which bearing structures are constructed predominantly of high density synthetic resin materials so as to provide reduced resistance to turning motion occurring between the two relatively moving parts.

An additional object of the present invention is to provide an improved idler arm construction for interconnecting two relatively moving elements in the front end steering assembly of an automobile, such idler arm assembly being inherently self-lubricating and being characterized in having a long and trouble-free operating life.

In addition to the foregoing described objects and advantages, additional objects and advantages will become apparent as the following detailed description is read in conjunction with the accompanying drawings which illustrate the invention.

In the drawings:

FIGURE 1 is a view in elevation of one embodiment of the present invention.

FIGURE 2 is a sectional view taken along line 2—2 of FIGURE 1.

FIGURE 3 is a horizontal sectional view taken through the longitudinal axis of the embodiment of the invention illustrated in FIGURE 1.

FIGURE 4 is a sectional view taken along line 4—4 of FIGURE 3.

FIGURE 5 is an exploded view of the high density synthetic resin bearing subassembly utilized in the idler arm assembly of the present invention.

FIGURE 6 is a sectional view of a portion of a modified embodiment of the idler arm assembly of the invention illustrating the manner in which the idler arm assembly is connected to a tapered stud or spindle of the type utilized in some automobile steering assemblies.

Referring now to the drawings in detail, the idler arm assembly of the invention includes an elongated idler arm designated generally by reference numeral 10. The idler arm 10, in a preferred embodiment of the invention, is of two-part construction in which two mating parts 12 and 14 are interconnected or joined along a central parting plane to form an idler arm having a hollow interior and being of relatively light weight. The mating parts 12 and 14 may conveniently be formed by stamping, and are interconnected by turning a flanged edge portion of one of the stamped parts over a flange carried at the joining edge of the other part as shown in the FIGURE 2 sectional view. At each end of the mating parts 12 and 14, these mated parts form a pair of centrally apertured hub portions 16 and 18. Each of the apertured hub portions 16 and 18 includes an inwardly turned frusto-conical skirt which is provided with a central aperture 20 which tapers from its open ends to a relatively small diameter in the center thereof and which has projecting into the center thereof from each of the mating parts 12 and 14, a radially inwardly extending flange 22. Each of the flanges 22 is provided with four recesses 24 (see FIGURE 4), the purpose of which is to permit the high density synthetic resin bushing members used in the idler arm assembly to be interlocked with, or keyed to, the idler arm, as will be more fully hereinafter described.

As is well understood in the technology relating to automobile steering linkages and assemblies, the idler arm functions to interconnect an idler arm bracket secured to the chassis or frame of the vehicle with a drag link which is moved to various positions during the steering of the automobile. It is thus necessary that the idler arm function to permit this relative movement between these two elements, and to this end, the idler arm assembly is provided with bearing elements of novel construction which are positioned in the apertures 20 through one or both of the hub portions 16 and 18 at opposite ends of the mating parts 12 and 14. This construction is most clearly illustrated in FIGURES 3 and 5. The bearing element employed in at least one of the hub portions of the idler arm assembly includes a pair of high density synthetic resin bushing members 26 and 28 which are substantially identical in construction, and which are pressed into the tapered apertures 20 in the hub portions 16 and 18 of the idler arm. Stated differently, the synthetic resin bushing members 26 and 28 are pressed into the apertures in the center of the hub portions at each end of the idler arm, and terminate adjacent the central parting plane along which the two parts 12 and 14 of the idler arm are joined. Each of the bushing members 26 and 28 is characterized in having a frusto-conical outer peripheral surface to match the taper of the apertures 20, and in having an annular, circumferentially extending flange 30 which bears against the outer surface of the mating parts 12 and 14 around the opening of the apertures 20 in the respective hub portions. The sealing function of the flange 30 will be hereinafter explained. Each of the bushing members 26 and 28 is also provided with a cylindrical outer neck portion 32 which projects or protrudes well beyond the respective aperture 20 through the hub portions 16 and 18 of the idler arm and lies on the opposite side of the circumferential flange 30 from the tapered outer peripheral surface of the respective bushing member.

Each of the bushing members 26 and 28 includes a centrally located, generally cylindrical spindle-receiving bore or aperture 34, and these cylindrical bores are aligned and in communication with each other when the bushing members 26 and 28 are properly positioned in the aperture 20 through the respective hub portions 16 and 18 of the idler arm 10. At the internal terminus of the bushing members 26 and 28, each of the members carries a pair of diametrically opposed keying protuberances or projections 36 which interlock with two diametrically opposed recesses 24 formed in the flanges 22 in the respective hub portions 16 and 18. Thus, when the bushing members 26 and 28 are pressed into the frusto-conical apertures 20 through the hub portions 16 and 18, the keying protuberances 36 interlock with the recesses 24 to prevent rotational movement of the bushings in the respective apertures 20 of the hub portions 16 and 18.

In the embodiment of the invention illustrated in FIGURES 1–5, a pair of spindles are passed through the apertured bushing members 26 and 28 disposed in the hub portions 16 and 18 at each end of the idler arm. In this embodiment of the invention, the spindles 40 and 42 have a generally cylindrical central portion 44 which is positioned concentrically within the bushing members 26 and 28, and are further characterized in having an annular rib 46 extending circumferentially around the spindle at one end of the cylindrical portion 44 and limiting the movement of the spindle into the central apertures 34 formed through the synthetic resin bushing members 26 and 28. The spindles are also provided with a tapered portion 48 which is positioned outside the bushing members 26 and 28, and each of the spindles is threaded at each of its ends. A nut 50 is provided on one of the threaded ends to fix the position of the spindle in its respective hub portion 16 or 18 of the idler arm. The manner in which the spindles 40 and 42 are connected to a fixed idler arm bracket and a movable drag link are well understood in the art and form no part of the present invention.

Positioned concentrically within the bushing members 26 and 28 and surrounding the exterior of the cylindrical portion 44 of each of the spindles 40 and 42 is a sleeve means which includes a metallic internal sleeve or liner 52 of generally cylindrical configuration, and a high density synthetic resin external sleeve or liner 54 which is pressed on and moves with the metallic liner 52. The resin liner 54 bears against, and is in bearing contact with, the bushings 26 and 28.

A dished or recessed cap 56 of a high density synthetic resin is fitted over the externally located cylindrical neck portion 32 of each of the bushing members 26 and 28 and, while dimensioned to afford a relatively snug fit, is movable relative to the respective bushing member 26 and 28 with which it is in contact. It will be noted in referring to FIGURE 2 that the synthetic resin cap 26 is provided with a central aperture which permits the metallic internal liner 52 and the synthetic resin external liner 54 to be passed therethrough, and the fit of each of the caps 56 around the synthetic resin external liner 54 is such that relative movement can occur easily between these elements during turning movement of one of the structural members which are interconnected by the idler arm assembly.

As final elements of the bearing elements located in the hub portions 16 and 18 at each end of the idler arm 10, a pair of metal cups 58 are pressed over each of the synthetic resin caps 56 and are centrally apertured so as to receive or pass the cylindrical portions 44 of each of the spindles but to bear against and limit the movement of the internal metallic liner 52 and the synthetic resin external liner 54. It will be noted from the drawings and the foregoing description that the constructions of the bearing elements located at each end of the idler arm 10 are substantially identical.

The synthetic resins which can be utilized in the bearing elements can be any material having a high degree of chemical inertness, good mechanical strength and a relatively low coefficient of friction. Preferred materials include polyethylene, nylon, Teflon, Kel-F, polypropylene and high density ethyl cellulose of the type sold under the registered trademark Selcon by the Celanese Corporation of America. Since, in the bearing elements, the bushing members 26 and 28 move relatively to the resin external sleeve 54 and to the resin caps 56, the bushing members are preferably constructed of a resin having a different molecular structure from the molecular structure of resin materlais from which the sleeve and caps are constructed. In the most preferred construction, the bushing members 26 and 28 are constructed from high density polyethylene, the sleeve 54 is constructed from polypropylene and the caps 56 are constructed from high density ethyl cellulose.

When the idler arm assembly of the invention has been fabricated and assembled in the manner described, a light weight idler arm assembly having a relatively high molecular strength is provided, with the assembly being further characterized in providing improved bearing elements for movably interconnecting two relatively moving parts, which elements provide a low resistance to turning movement of the connected parts, and have a high resistance to corrosion and deterioration resulting from the infiltration of mud, water and other foreign materials into the bearing elements. The hollow two-part construction of the idler arm provides an improved ability of the assembly to withstand torque forces imposed on the arm by undesirable twisting movement of the elements which it interconnects, which improved ability constitutes an advantage over the solid cast or forged idler arms prevalently heretofore in use.

By the construction of the bearing elements at each end of the idler arm, metal-to-metal contact is avoided in bearing surfaces, wih the relative movement being effected, in all cases, between two contacting, high density synthetic resin surfaces (with the relatively insignificant exception of the small area where the metal cups 58 contact the internal metallic liner 52 at each end thereof). The provision of the synthetic resin caps 56 and the metal cups 58 assure a tight seal at each end of the bearing elements preventing the ingress or infiltration of mud, water and other deleterious materials to the interior of the bearing. Moreover, the manner in which the bearing elements are assembled permit them to be quickly disassembled should it be necessary or desirable to replace one or more elements of the bearing after extended periods of use. The relatively high mechanical strength of the high density resin elements, however, together with the inherent resistance to chemical corrosion of the preferred synthetic resin materials hereinbefore described, assure the bearing of a relatively long service life which will generally be equivalent to, or will exceed, that of bearings of the type previously utilized and employing ball bearings or various metallic elements which are subject to fatigue and corrosion after extended usage. The relatively low coefficient of friction of the preferred synthetic resin materials which are used in constructing the bearing elements assures that very little resisance will be offered to turning movement of the drag link, and when the most suitable construction is used in which synthetic resins of differing molecular construction are employed at the contacting bearing surfaces, a highly efficient bearing is provided which permits maximum ease in the steering of the automobile.

A modified structure which it is sometimes desirable to use in the idler arm assembly is depicted in FIGURE 6 of the drawings. In some types of steering mechanisms utilized on various models of automobiles, a different type of spindle will be employed for securing the idler arm assembly with one of the relatively moving parts which it interconnects than the two spindle types 40 and 42 hereinbefore described. This modified type of spindle is characterized in having a tapered shank portion which requires a different construction of the hub portion located at one end of the idler arm. This tapered spindle and the modified idler arm assembly to which it is connected are depicted in FIGURE 6. It will thus be noted that the spindle 60 has an external shank portion 62, and a tapered or frusto-conical internal portion 64. The tapered portion 64 of the spindle 60 extends through a metallic bushing 66 which is secured in the aperture through one of the hub portions 16 at an end of the mating parts 12 and 14 of the idler arm. At the hub portion 18 at the opposite end of the idler arm (not visible), a bearing element is located which is of substantially identical construction to that which has previously been described in referring to FIGURES 1–5. The metallic bushing 66 can typically have a cylindrical external surface, and may be welded or otherwise suitably secured between jaw portions formed on the ends of the mating parts 12 and 14 as shown in FIGURE 6. Other means of rigid securement can also be satisfactorily used, however. The tapered or frusto-conical bore or aperture through the bushing 66 is dimensioned to provide a press fit of the tapered portion 64 of the spindle 60, so that in this particular embodiment, no relative movement occurs between the spindle 60 and the idler arm 10. Rather, the necessary movement is permitted to occur between the idler arm 10 and the bracket or other member to which it is connected through the bearing element located on the other end of the idler arm.

Although certain specific embodiments of the invention have been herein described in order to provide examples of how the invention is to be practiced, a number of modifications and innovations can be effected in the depicted structure without departure from the basic principles underlying the invention. All such changes are deemed to be circumscribed by the spirit and scope of the invention except as the same may be necessarily limited by the appended claims or reasonable equivalents thereof.

We claim:
1. An idler arm assembly comprising:
   a two-part hollow idler arm having two mating parts joined at a central parting plane containing the longitudinal axis of the idler arm, said idler arm having apertured, spindle-receiving hub portions at each end thereof;
   synthetic resin bushing means positioned in the aperture in each of said hub portions, each of said bushing means comprising a pair of frusto-conical, centrally apertured, synthetic resin bushing members pressed into the aperture through each hub portion from the opposite sides thereof, and each keyed to at least one of the mating parts of the idler arm to prevent rotation of the respective bushing member in the respective hub portion aperture;
   a spindle extending through the aperture in said synthetic resin bushing means; and
   sleeve means around said spindle inside said bushing means.

2. An idler arm assembly comprising:
   a two-part hollow idler arm having two mating parts joined at a central parting plane containing the longitudinal axis of the idler arm, said idler arm having apertured, spindle-receiving hub portions at each end thereof;
   synthetic resin bushing means positioned in the aperture through at least one of said hub portions and having a central aperture extending therethrough;
   a first spindle extending through the aperture in said synthetic resin bushing means;
   sleeve means around said spindle inside said bushing means;
   a metallic bushing secured in the aperture in the other of said hub portions from that containing said synthetic resin bushing means and having a tapered, generally frusto-conical bore therethrough; and
   a second spindle having a tapered outer peripheral surface pressed into the frusto-conical bore through said metallic bushing.

3. An idler arm assembly as defined in claim 1 wherein each of said bushing members is characterized in having an annular flange formed thereon and bearing against the portion of one of said mating parts which forms said apertured hub portion to seal said aperture against the ingress of deleterious material; and a synthetic resin cap covering the end of each of said bushing members outside the hub portion in which said bushing members are located.

4. An idler arm assembly as defined in claim 3 wherein said sleeve means includes a synthetic resin cylindrical sleeve extending through the apertures in said pair of bushing members and in bearing contact with said pair of bushing members.

5. An idler arm assembly as defined in claim 4 wherein said sleeve means further includes a rigid metallic cylindrical liner inside said resin sleeve and around said spindle.

6. An idler arm assembly as defined in claim 5 and further characterized to include a metal cup pressed over each of said synthetic resin bearing caps and bearing against each end of said rigid metallic cylindrical liner.

7. An idler arm assembly as defined in claim 6 wherein said spindle is characterized in having an annular rib extending circumferentially therearound and limiting movement of the spindle into the aperture through said synthetic resin bushing means; and said assembly is further characterized in having a nut threaded on said spindle on the opposite side of said synthetic resin bushing means from said annular rib.

8. An idler arm assembly comprising:

a hollow, elongated idler arm having an apertured hub portion at each end thereof, each of said hub portions having an aperture therethrough which is of circular cross-section and diminishes in diameter from its two open ends to the center of the aperture whereby each of the apertures includes two communicating frusto-conical portions;

bushing means in said apertures through each of the hub portions, each of said bushing means including two substantially identical centrally apertured frusto-conical, synthetic resin bushing members extending into the aperture in the respective hub portion from the opposite sides thereof and each keyed to the respective hub portion of said idler arm to prevent rotation of each bushing member in its respective hub portion;

a spindle extending through the apertures in each pair of bushing members in each of said apertured hub portions;

synthetic resin sleeve means positioned around each of said spindles and between the respective spindle and the apertured bushing members through which the respective spindle extends;

stop means on each of said spindles preventing axial movement of the spindles in their respective bushing members;

a synthetic resin cap covering the end of each of said bushing members and having a central aperture dimensioned to pass the respective spindle and the sleeve means positioned therearound; and a metal cap receiving each of the resin caps and each bearing against one end of one of said sleeve means, said metal caps each being centrally apertured to pass said spindle and bearing against a portion of said stop means.

9. An idler arm assembly comprising:

a two-part, hollow idler arm having a pair of mating parts joined along a central parting plane located at substantially the longitudinal axis of the idler arm, said idler arm having apertured, spindle-receiving hub portions at each end thereof;

a pair of frusto-conical, centrally apertured, synthetic resin bushing members pressed into the aperture through one of said hub portions from opposite sides thereof and each keyed to at least one of the mating parts of the idler arm to prevent rotation of the bushing member in the hub portion aperture;

a spindle extending through the aperture in said synthetic resin bushing means; and sleeve means around said spindle inside said bushing means.

10. An idler arm assembly comprising:

a two-part hollow idler arm having two elongated mating parts joined at a central parting plane which extends through the idler arm over its length, each of said mating parts having an inwardly turned, frusto-conical skirt at one end thereof defining a centrally disposed aperture through the respective part, and said two mating parts being joined so that said frusto-conical skirts are aligned within a hub portion of the idler arm and define an aperture extending completely through the idler arm, the frusto-conical skirt of each of said mating parts carrying a flange which extends radially inwardly with respect to the aperture through the respective frusto-conical skirt and adjacent said parting plane, the radially inwardly extending flanges of the aligned skirts in said two mating parts bearing against each other;

synthetic resin bushing means positioned in the apertured hub portion of said idler arm and including a pair of centrally apertured, synthetic resin bushing members pressed from opposite sides of said hub portion into the aperture extending through said hub portion from opposite sides thereof, each of said synthetic resin bushing members being keyed to one of said radially inwardly extending flanges to prevent rotation of each of the bushing members in the aperture through the hub portion of said idler arm.

References Cited

UNITED STATES PATENTS

| | | | |
|---|---|---|---|
| 2,305,880 | 12/1942 | Leighton | 280—95 |
| 2,809,049 | 10/1957 | Carlson | 280—95 |
| 2,932,081 | 5/1960 | Witte | 308—238 |
| 3,072,448 | 1/1963 | Melton et al. | 280—95 |
| 3,180,655 | 4/1965 | Gerner | 280—95 |

KENNETH H. BETTS, *Primary Examiner.*